United States Patent
Wimmer

(10) Patent No.: US 8,270,174 B2
(45) Date of Patent: Sep. 18, 2012

(54) HARDWARE PROTECTION SYSTEM FOR SENSITIVE ELECTRONIC-DATA MODULES PROTECTING AGAINST EXTERNAL MANIPULATIONS

(75) Inventor: Anton Wimmer, Reichersbeuern (DE)

(73) Assignee: Siemens Aktiengesellschaft, Munich (DE)

( * ) Notice: Subject to any disclaimer, the term of this patent is extended or adjusted under 35 U.S.C. 154(b) by 622 days.

(21) Appl. No.: 11/988,093

(22) PCT Filed: Jun. 30, 2005

(86) PCT No.: PCT/EP2005/053111

§ 371 (c)(1),
(2), (4) Date: Dec. 31, 2007

(87) PCT Pub. No.: WO2007/003228

PCT Pub. Date: Jan. 11, 2007

(65) Prior Publication Data

US 2008/0278922 A1    Nov. 13, 2008

(51) Int. Cl.
*H05K 1/14* (2006.01)
(52) U.S. Cl. ........ 361/736; 361/742; 361/790; 361/799; 361/800
(58) Field of Classification Search .................. 361/717, 361/728, 726, 736, 735, 742, 748, 790, 794, 361/799, 800; 257/685, 686, 690, 723, 724, 257/700, E25.013; 174/250, 255, 260, 261
See application file for complete search history.

(56) References Cited

U.S. PATENT DOCUMENTS

| | | | |
|---|---|---|---|
| 4,807,284 A | 2/1989 | Kleijne | |
| 5,233,505 A | 8/1993 | Chang et al. | |
| 5,269,378 A | 12/1993 | Maas et al. | |
| 5,285,734 A | 2/1994 | MacPherson | |
| 5,570,274 A * | 10/1996 | Saito et al. | 361/784 |
| 6,075,700 A * | 6/2000 | Houghton et al. | 361/704 |
| 6,344,688 B1 * | 2/2002 | Wang | 257/724 |
| 6,853,093 B2 | 2/2005 | Cohen et al. | |
| 7,170,155 B2 * | 1/2007 | Heck et al. | 257/684 |
| 7,368,808 B2 * | 5/2008 | Heck et al. | 257/678 |
| 7,629,201 B2 * | 12/2009 | Gan et al. | 438/106 |
| 2001/0054758 A1 | 12/2001 | Isaak | |
| 2003/0174478 A1 * | 9/2003 | Oggioni et al. | 361/760 |
| 2004/0089943 A1 * | 5/2004 | Kirigaya et al. | 257/723 |
| 2004/0120101 A1 * | 6/2004 | Cohen et al. | 361/654 |
| 2005/0167795 A1 * | 8/2005 | Higashi | 257/678 |

FOREIGN PATENT DOCUMENTS

| | | |
|---|---|---|
| CN | 1510810 | 7/2004 |
| DE | 19512266 A1 | 3/1996 |
| DE | 100 45 025 | 4/2001 |

(Continued)

OTHER PUBLICATIONS

International Search Report (PCT/ISA/210) mailed Mar. 9, 2006 in connection with the International Application PCT/EP2005/053111.
German language Japanese Office Action for JP 2008-519803, issued on Jul. 14, 2010.
Chinese Office Action for CN 200580051453.6, issued on Nov. 6, 2009.

(Continued)

*Primary Examiner* — Hoa C Nguyen
(74) *Attorney, Agent, or Firm* — Staas & Halsey LLP

(57) ABSTRACT

A hardware protection system is integrated into a circuit carrier. As a result, a sensor system, which is integrated into the circuit carrier in the form of printed circuit boards, which can be produced by means of the traditional high-tech printed circuit board technology and can be equipped with and processed on traditional insertion lines of electronic module installations, is obtained.

20 Claims, 4 Drawing Sheets

FOREIGN PATENT DOCUMENTS

| | | |
|---|---|---|
| DE | 10047436 A1 | 8/2002 |
| EP | 0 526 066 | 2/1993 |
| EP | 1 432 031 | 6/2004 |
| FR | 2758935 | 7/1998 |
| JP | 6-24477 | 2/1994 |
| JP | 2003-229510 | 8/2003 |
| JP | 2004-158700 | 6/2004 |
| JP | 2005-116897 | 4/2005 |
| WO | 03/019467 | 3/2003 |
| WO | 2005/041002 | 5/2005 |

OTHER PUBLICATIONS

Japanese Office Action issued May 12, 2010 in related Japanese Patent Application 2008-519802.

International Search Report for related International Patent Application No. PCT/EP2005/053108, mailed on Apr. 3, 2006.

U.S. Office Action for related U.S. Appl. No. 11/988,091, mailed on Oct. 14, 2010.

U.S. Office Action for related U.S. Appl. No. 11/988,091, mailed on Apr. 14, 2011.

* cited by examiner

HARDWARE PROTECTION SYSTEM FOR SENSITIVE ELECTRONIC-DATA MODULES PROTECTING AGAINST EXTERNAL MANIPULATIONS

CROSS REFERENCE TO RELATED APPLICATIONS

This application is based on and hereby claims priority to PCT Application No. PCT/EP2005/053111 filed on Jun. 30, 2005, the contents of which are hereby incorporated by reference.

BACKGROUND OF THE INVENTION

Electronic modules for highly sensitive data processing and data security, as are used for instance in trip recorders for commercial vehicles but also in financial institutions, ATMs, airplanes and everywhere where sensitive data is managed, are to be protected in a hardware-specific fashion against external manipulations, such as chemical or physical attacks for instance (for instance mechanical, laser, fire etc.), so that data cannot be manipulated.

A solution existed until now in which the electronic module to be protected was packed all around by what is known as a drilling protection film. Such a drilling protection film is produced for instance as a finished product by the company Gore or it is offered by the company Freudenberg as a film with silver-loaded conductive ink. The film is electrically connected inwardly to the module. Once the electronic module has been packed in a three-dimensional fashion, it is then molded in a container with a resin. When attempting to open the package, the electrical conductors or resistance lines on the films are damaged and interrupted by force at the points at which the attacks take place, which results in the stored data in the electronic module being deleted immediately. As a result, the data can not be manipulated and the attack can thus be recognized from the outside by corresponding control organs.

Two problems result with this method known from the related art. On the one hand the use of a film does not correspond to any electronic-compatible assembly method. On the other hand, the film is also often already damaged during assembly, thereby resulting in a high level of wastage.

SUMMARY

Based hereupon, one potential object is to provide a hardware protection system for electronic modules, which can be integrated into an electronic-compatible installation.

Accordingly, the inventor proposes a hardware protection system in the form of a circuit carrier, which surrounds an interior space for components of a circuit to be protected. The system includes conductor structures surrounding the interior space, in the form of a meshed entity or cage for instance, in order to detect unauthorized external manipulations of the circuit. The conductor structures for detecting attacks on the circuit are thus directly integrated into the circuit carrier of the circuit.

The conductor structures surrounding the interior space can be designed for instance as conductive surfaces and/or as narrowly structured entities in the form of a grid, in the form of a mesh, having meanders and/or sectors, into which the conductor structures pass in different geometrical shapes. The insulation clearance between two courses of the conductor structures in the form of conductors or conductor paths are to correspond here to conventional HDI (High Density Interconnection) structures. The same applies to the width of the courses of the conductor structures. In the case of an unauthorized attack on the circuit, the conductor structures are damaged, so that a contact is closed or interrupted and the attack on the circuit is thus detected.

The hardware protection system overall module preferably comprises circuit carriers in the form of one or a plurality of printed circuit boards. This/these printed circuit board(s) can comprise at least some of the components of the circuit to be protected on and/or in its/their side(s) pointing toward the interior space. Furthermore, it/they can comprise a part of the conductor structures surrounding the interior space on and/or in its/their side(s) facing away from the interior space.

Advantageously, the printed circuit board is a multilayered printed circuit board or a multilayered ceramic substrate with layers for the conductor structures surrounding the interior space and layers for wiring some of the components of the circuit to be protected.

The layers for wiring some of the components of the circuit to be protected are in particular arranged on and/or in the side of the printed circuit board pointing toward the interior space. Through-contacts in the printed circuit board can be embodied as buried through-contacts and/or microvias (micro-blind hole) of the most varied of technologies (plasma-etched, photo definable or laser-bored).

Alternatively or in addition, build-up layers to be generated as sequential build-up layers, with, in particular microvias of the most varied of technologies, are embodied as through-contacts for a wiring of some of the components of the circuit to be protected in the printed circuit board.

Preferably the hardware protection system module comprises a further multilayered printed circuit board and/or multilayered ceramic substrate, which is arranged opposite to the first printed circuit board, supports a further part of the conductor structures surrounding the interior space on and/or in its side facing away from the interior space and comprises further components of the circuit to be protected in particular on and/or in its side pointing toward the interior space.

A frame printed circuit board is advantageously arranged between the printed circuit board and the further printed circuit board, said frame printed circuit board spacing the two printed circuit boards and as a result generating the interior space between itself and the printed circuit board. The frame printed circuit board is in particular designed in multilayered printed circuit board technology or multilayered ceramic substrate, for instance by arranging dielectric layers and electrically conductive layers layer by layer on top of one another.

The interior space can be a cavity, but need not necessarily be such. By way of example, if the components are molded in the interior space, the interior space is filled with a cast resin.

The circuit carrier comprises in particular terminals for connecting detectors in order to detect damage to the conductor structures.

The overall circuit carrier is thus preferably at least essentially designed in multilayered printed circuit board technology and/or multilayered ceramic technology.

The overall module with the circuit carriers is used in particular in a tachograph, a journey data recorder and/or a rail-bound or non-rail-bound motor vehicle. It can however also be used in ATMs, devices for financial institutions and airplanes for instance. In particular, the use of the overall module with the circuit carriers is always advantageous if cryptographic keys (RSA, DES) to be protected are used.

With a method for producing a circuit carrier, which surrounds an interior space for components of a circuit to be protected, this circuit carrier with the conductor structures surrounding the interior space is produced in order to detect attacks on the circuit. Advantageous embodiments of the method result from the advantageous embodiments of the circuit carrier and vice versa.

A device with a circuit carrier of one of the previously illustrated types preferably contains detectors for detecting damage to the conductor structures as a result of unauthorized access and/or unauthorized manipulation. To thus also ensure that the detectors themselves are protected, they can be embodied as an integral part of the circuit to be protected.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
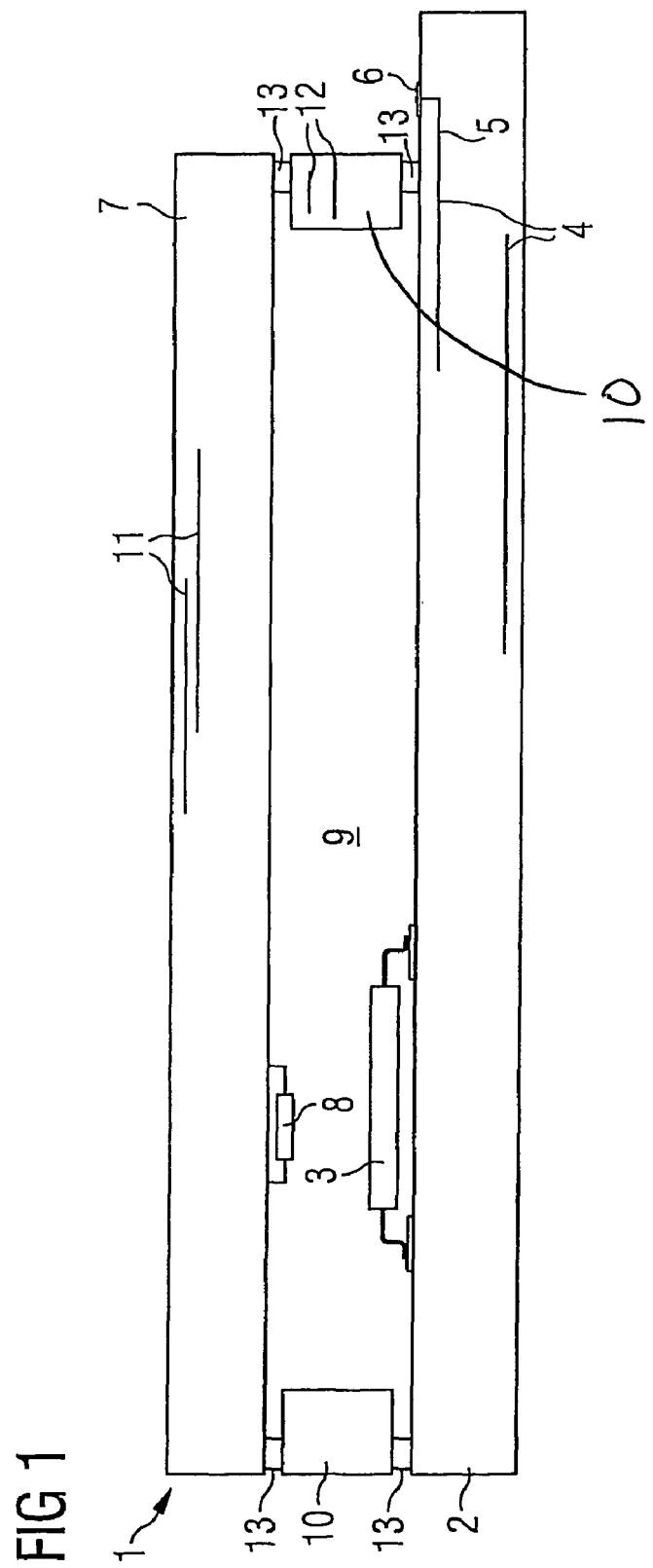
FIG. 1 shows a schematic illustration of an integrated hardware protection system for electronic modules
Figure 2:
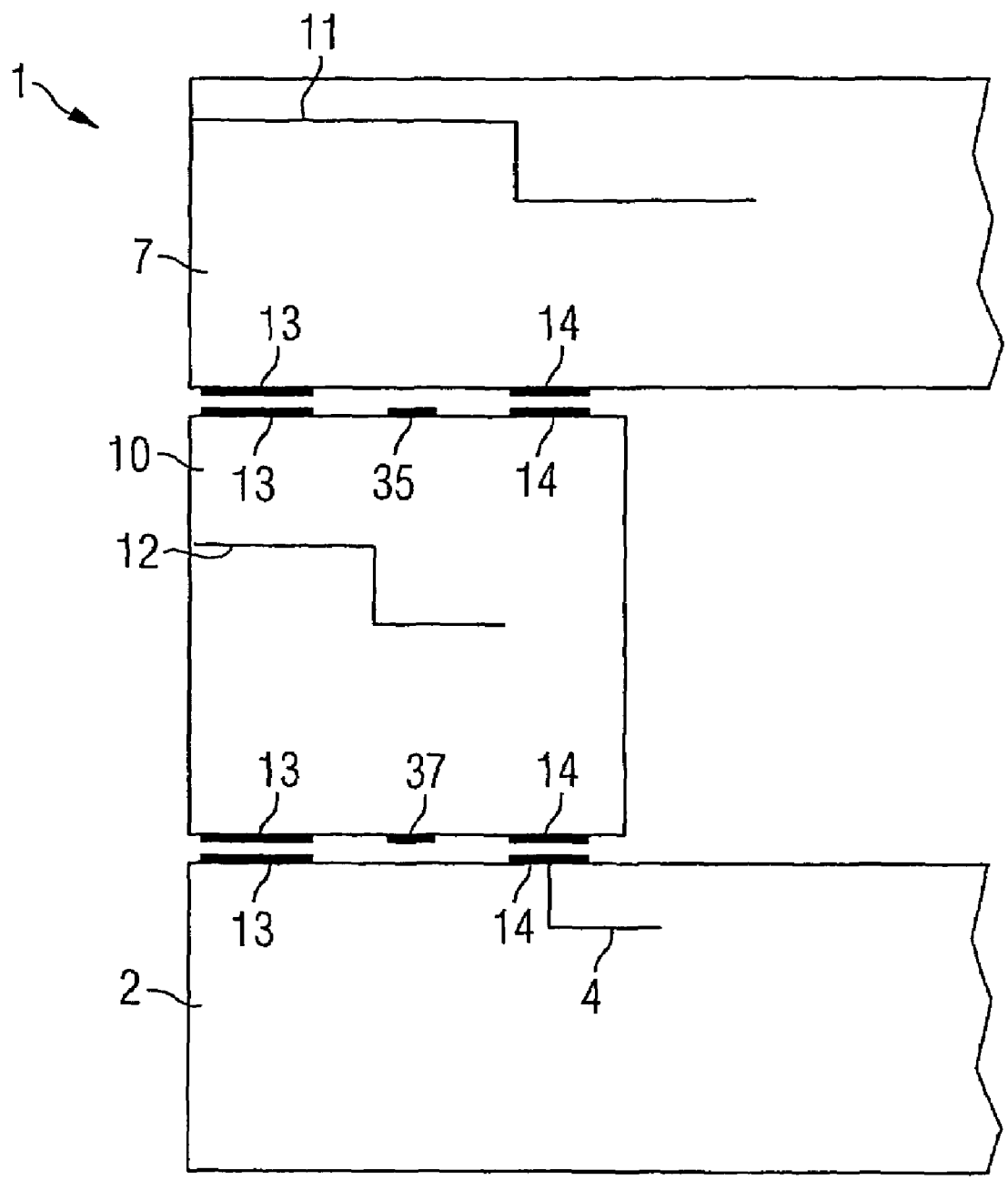
FIG. 2 shows a schematic partial illustration of one potential embodiment of the hardware protection system proposed by the inventor.

Reference will now be made in detail to the preferred embodiments of the present invention, examples of which are illustrated in the accompanying drawings, wherein like reference numerals refer to like elements throughout.

FIG. 1 shows a circuit carrier 1 with a first submodule in the form of a printed circuit board 2 having some components 3 of a circuit to be protected. The circuit board 2 has conductor structures 4 in the form of a protection layer as part of a multilayered wiring in order to detect attacks on the circuit to be protected. Furthermore, it has lead-throughs 5 for signal lines and voltage supply of the circuit to be protected outside the circuit carrier. These lead-throughs 5 pass through the conductor structures surrounding the interior space and terminate at a plug assembly point 6.

The circuit carrier 1 also has a further printed circuit board 7, which comprises further components 8 of the circuit to be protected.

The further components 8 of the further printed circuit board 7 are arranged on the side of the further printed circuit board, which points to the side of the printed circuit board 2, on which are disposed some components 3 of the circuit to be protected. All components of the circuit to be protected are thus disposed between the printed circuit board 2 and the further printed circuit board 7 in an interior space 9 formed between the printed circuit boards.

The printed circuit board 2 and the further printed circuit board 7 are spaced by frame printed circuit boards 10, which is arranged between the two printed circuit boards and surrounds the interior space 9 together with the printed circuit board 2 and the further printed circuit board 7. The printed circuit board 2, the further printed circuit board 7 and the frame printed circuit boards 10 are embodied in each instance such that wirings and components 3, 8 of the circuit to be protected are arranged in and/or on the sides and/or regions of the printed circuit board 2, the further printed circuit board 7 and the frame printed circuit boards 10 facing the interior space 9. These wirings and components 3, 8 and thus the overall circuit to be protected are completely surrounded by an entity of conductor structures 4 of the printed circuit board 2, conductor structures 11 of the further printed circuit board 7 and conductor structures 12 of the frame printed circuit boards 10, which are each electrically connected to each other. The conductor structures 11, 12, 4 are connected to one another between the different circuit boards 1, 2, 10 by terminals 14. These terminals 14 are arranged irregularly. The conductor structures are coupled to detectors embodied as a special electronic circuit in order to detect damage to the conductor structures. The conductor structures can be regarded as belonging to the detectors. Externally circumferential connecting frames 13 are electrically coupled to the special electronic module, thereby producing an additional protective function.

Circumferential conductor structures 35, 37 are provided between the circumferential connecting frame 13 and the terminals 14 used to connect different printed circuit boards, said conductor structures being electrically coupled to the detector.

Figure 3:
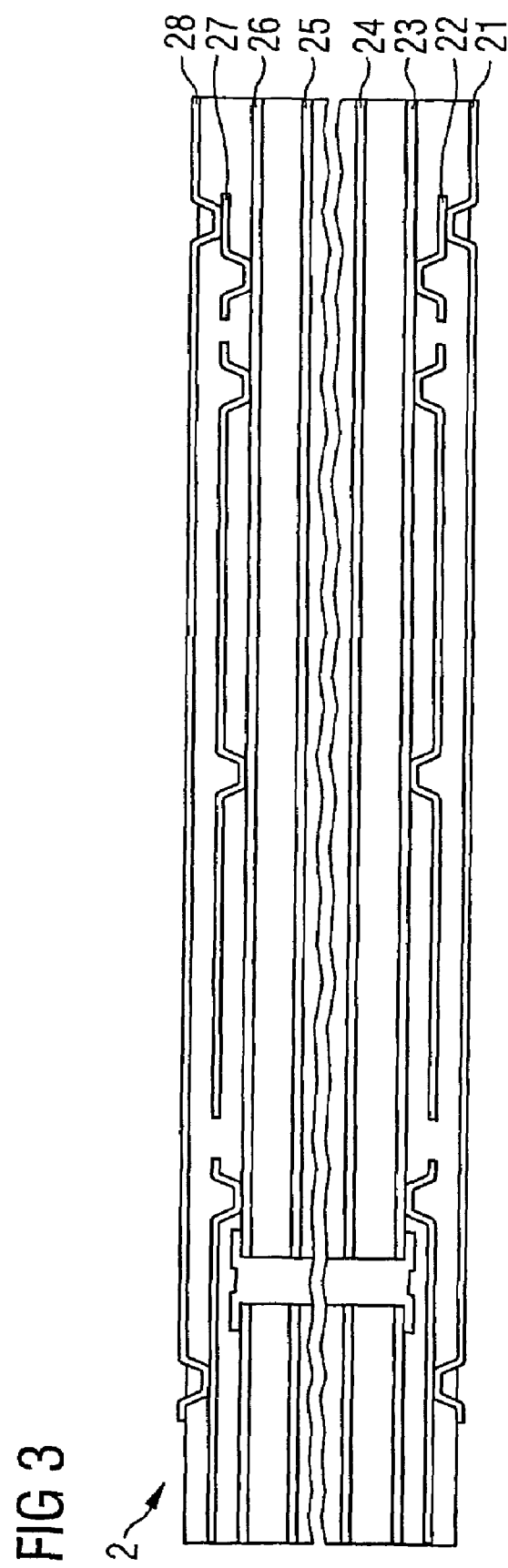
FIG. 3 shows a sectional illustration of the printed circuit board structure of the hardware protection system as shown in FIG. 1

FIG. 3 shows the set-up of the printed circuit board 2. This contains an earthing layer 21, at least one hardware protection system meshed layer 22 for the conductor structures 4, at least one hardware protection system wiring layer 23, at least one power supply layer 24, at least one earthing layer 25, a plurality of signal layers 26, 27, 28. The arrangement of the layers is selected such that the protective layers are arranged externally and the signal and power supply layers are arranged internally.

Figure 4:
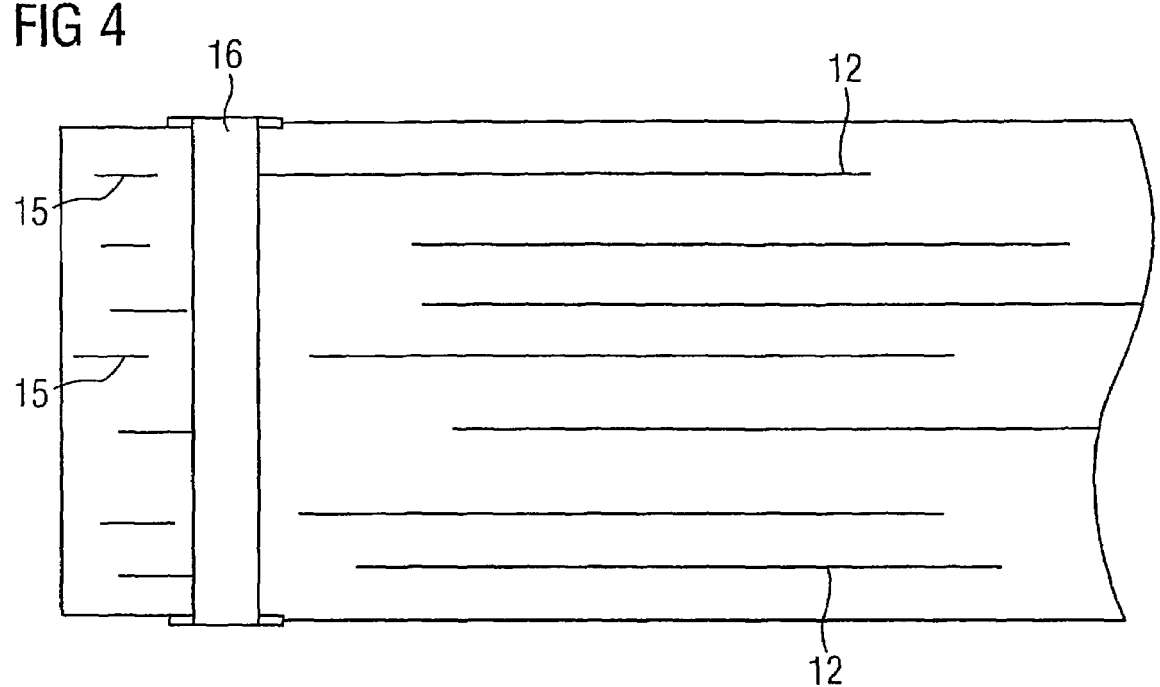
FIG. 4 shows a frame printed circuit board of the hardware protection system as shown in FIG. 1.

FIG. 4 shows the set-up of the printed circuit board for the frame printed circuit board 10. The frame printed circuit board 10 is formed of a multilayered printed circuit board or a multilayered ceramic substrate formed of n conductor layers with conductor structures 15, with the spacing of two conductor planes being less than 500 μm. To contact the individual layers with one another, as well as the printed circuit board 2 and the further printed circuit board 7, the frame printed circuit board 10 contains through holes 16 in the form of plated through holes, which run at right angles to the layers from the printed circuit board 2 to the further printed circuit board.

The hardware-specific manipulation protection system is thus integrated directly into the electronic module, in other words, in the printed circuit boards 2, 7 used for the module. As a result, an integrated hardware protection system is produced for electronic modules in the form of a circuit carrier 1 having conductor structures in order to detect attacks on a circuit located in the interior space 9 of the circuit carrier 1.

To this end, the embodiment of the module is thus consequently embodied such that it comprises two submodules, with both submodules only being inserted on one side with components in the form of components 3, 8 of the circuit to be protected.

The printed circuit boards 2, 7 for these submodules are designed such that they are embodied as multilayered printed circuit boards, with the inner and outer layers required for wiring the components 3, 8 facing the component-inserted side and not comprising any electrical through contacts on the rear of the printed circuit board pointing outwards, in other words the side facing the component-inserted side.

To this end, the through contacts required for the function of the module of the circuit to be protected are embodied as buried vias or the necessary build-up layers for the submodule wiring are embodied as sequential build up structures with plasma-etched, photolithographic or microvia through-contacts generated by laser bores. Sequential build-up layers are applied to an existing core for this purpose and are provided with microvias.

The submodule printed circuit boards comprise contact pads in the array arrangement outside the component-inserted region on the component-inserted side, said contact pads subsequently being used to electrically connect the two submodules "Face to Face" inserted with components on the one hand by way of the frame printed circuit board 10 in the form of a multilayered circuit.

The printed circuit boards 2, 7 of the submodules likewise contain on the side facing the component-inserted side, in other words the side facing away from the interior space 9, a plurality of conductive layers. These are embodied for instance as multi-layered copper layers with conductor structures 4, 11, which are realized in each instance as very finely structured conductors, which cover the overall layer surface in a closed-meshed fashion on the one hand and extend however from layer to layer, due to the embodiment of the conductors.

The conductor widths of the one layer cover the insulation clearances and a part of the associated conductor paths of the layers disposed therebelow and separated by the dielectric.

They are again likewise through-wired inwardly toward the module by way of buried vias or microvias.

The embodiment of a layer for instance in the x-direction with a meander structure of this type made of copper conductor paths and of the layer disposed therebelow and thereabove in the y-direction with a structure of this type separated by a dielectric layer produces a hardware protection system of the module for protecting against mechanical manipulations, characterized in that these conductors 4, 11 are interconnected inwardly with the module and thus due to the ultra-fine structuring are externally damaged during attacks. As a result, an interruption and/or short circuit of the conductor structures 4, 11 takes place, which is registered in the circuit and/or module.

The finest conductor can also be embodied in the resistance paste printing (integrated resistors with defined resistance values) as conductive paste (ceramic thick film technology) or as ink printing with carbon ink (integrated resistors with defined resistance values) in all imaginable structures, which generate a close-meshed entity over a large surface area across at least one layer and which are inwardly electrically connected to the module.

At least one of the circuit boards 2, 7 of the submodules can also be embodied as a flex rigid printed circuit board and/or a flex conductor for data transmission can be attached to a rigid printed circuit board.

The dielectric distance of the hardware protective layers in the printed circuit boards of the submodules is selected such that the protective layers disposed thereabove and therebelow are damaged even with a front-sided spot drilling, and thus the protective mechanism is triggered. By way of example, the frame circuit board 10 could be embodied rigidly and the two printed circuit boards 2, 7 of the submodules could also be embodied as flexible circuit.

To connect the two submodules arranged "Face-to-Face", a printed circuit board construction is likewise used in a similar refinement as described above. This printed circuit board is constructed as a frame printed circuit board 10 and is designed as a multilayer, which, due to its structure, subsequently avoids attacking the overall module on the front side. This is as a rule achieved by spacing the individual layers less than 500 µm. The electrical through-contacts 16, which in the assembled state electrically connect the two submodules, are disposed within the layouts of the protective circuits. In the layout regions, which contain the conductor structures 12 in the form of conductors or pressed resistors or suchlike for the protective function, the concealed through-contacts are distributed irregularly for the individual layers of the protective circuits. Both through-contact types or fashions are designed on the upper and lower side of the frame-type multilayered printed circuit board of the frame printed circuit board 10 in terminal pads, which are then used to contact the individual submodules.

The electrical connection and the mechanical connection of the submodules with the frame printed circuit board can be carried out by soldering by subsequently sealing the soldering gap by adhesives, lamination, contact adhesive sealing or suchlike.

A sensor system which is integrated into the circuit carrier in the form of printed circuit boards is produced in the manner described, it being possible to manufacture said sensor system using conventional "Hightech" printed circuit board technology and to insert it with components and process it on traditional insertion lines of electronic module installations. Furthermore, it is advantageous to provide and integrate a secure and cost-effective security system, which is to be processed for assembly without additional outlay, directly into the electronic module, which reliably detects hardware attacks.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A circuit carrier, which surrounds an interior space for components and wirings of a circuit to be protected, comprising:
   first, second and at least one frame printed circuit boards, having respective conductor structures surrounding the interior space in order to detect attacks on the circuit, the components and their wirings of the interior space being completely surrounded by the conductor structures of the first printed circuit board, conductor structures of the second printed circuit board and conductor structures of the at least one frame printed circuit board; and
   a circumferential connecting frame to connect the circuit boards to one another.

2. The circuit carrier as claimed in claim 1, wherein
   a first of the components of the circuit to be protected is provided in the first printed circuit board or on a side of the first circuit board facing toward the interior space, and
   the conductor structure of the first printed circuit board is provided exterior to the first component relative to the interior space.

3. The circuit carrier as claimed in claim 2, wherein the first printed circuit board is a multilayered printed circuit board or a multilayered ceramic substrate with a layer for the conductor structure surrounding the interior space and a layer for wiring the first component of the circuit to be protected.

4. The circuit carrier as claimed in claim 3, wherein the layer for wiring the first component of the circuit to be protected faces toward the interior space.

5. The circuit carrier as claimed in claim 4, wherein through-contacts of the circuit to be protected are embodied in the first printed circuit board as buried vias.

6. The circuit carrier as claimed in claim 5 wherein the first printed circuit board is provided with sequential build up layers for wiring the first component of the circuit to be protected.

7. The circuit carrier as claimed in claim 6 wherein
the second printed circuit board is arranged opposite the first printed circuit board,
a second of the components of the circuit to be protected is provided in the second printed circuit board or on a side of the second circuit board facing toward the interior space, and
the conductor structure of the second printed circuit board is provided exterior to the second component relative to the interior space.

8. The circuit carrier as claimed in claim 7, wherein the frame printed circuit board is positioned between the first printed circuit board and the second printed circuit board.

9. The circuit carrier as claimed in claim 8, wherein the frame printed circuit board is a multilayered printed circuit board.

10. The circuit carrier as claimed in claim 9 wherein the printed circuit boards of the circuit carrier are multilayered printed circuit boards.

11. The circuit carrier as claimed in claim 2, wherein through-contacts of the circuit to be protected are embodied in the first printed circuit board as buried vias.

12. The circuit carrier as claimed in claim 3, wherein the first printed circuit board is provided with sequential build up layers for wiring the first component of the circuit to be protected.

13. The circuit carrier as claimed in claim 3, wherein
the second printed circuit board is arranged opposite the first printed circuit board,
a second of the components of the circuit to be protected is provided in the second printed circuit board or on a side of the second circuit board facing toward the interior space, and
the conductor structure of the second printed circuit board is provided exterior to the second component relative to the interior space.

14. The circuit carrier as claimed in claim 13, wherein the frame printed circuit board is positioned between the first printed circuit board and the second printed circuit board.

15. The circuit carrier as claimed in claim 14, wherein the frame printed circuit board is a multilayered printed circuit board.

16. The circuit carrier as claimed in claim 1, wherein the printed circuit boards of the circuit carrier are multilayered printed circuit boards .

17. The circuit carrier as claimed in claim 1, wherein
both the circumferential connecting frame and connection terminals are provided between the printed circuit boards,
the conductor structures of the printed circuit boards are connected to one another via the connection terminals,
the connection terminals have an irregular positioning between the printed circuit boards, and
the circumferential connecting frame is positioned radially outward from the connection terminals so as to protect the connection terminals from intrusion.

18. The circuit carrier as claimed in claim 1, wherein there are a plurality of frame printed circuit boards sandwiched between the first and second printed circuit boards to surround the interior space.

19. A device comprising:
trip recorder, motor vehicle, airplane, data recorder and/or ATM circuit having components and wirings to be protected;
a circuit carrier, which surrounds an interior space, the components and wirings being provided in the interior space, the circuit carrier comprising first, second and at least one frame printed circuit boards, having respective conductor structures surrounding the interior space in order to detect attacks on the circuit, the components and their wirings of the interior space being completely surrounded by the conductor structures of the printed circuit boards; and
a circumferential connecting frame to connect the circuit boards to one another.

20. A method of producing a circuit carrier, which surrounds an interior space for components and wirings of a circuit to be protected, comprising:
providing first, second and at least one frame printed circuit boards, having respective conductor structures;
positioning the at least one frame printed circuit board between the first and second printed circuit boards around the interior space in order to detect attacks on the circuit, the printed circuit boards and the conductor structures being positioned such that the conductor structures completely surround the components and wirings of circuit to be protected; and
connecting the printed circuit boards to one another with a circumferential connecting frame.

* * * * *